L. MOORE.
Hand-Seeder.
No. 21,354
Patented Aug. 31. 1858.
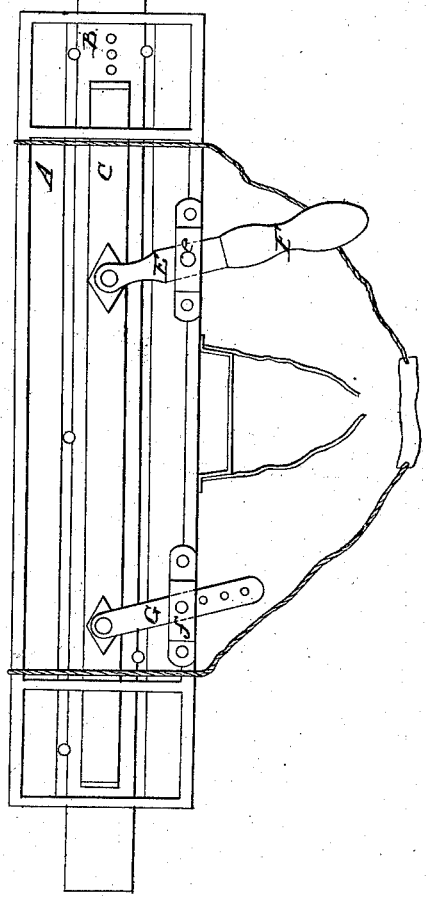
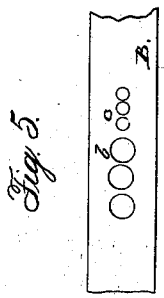
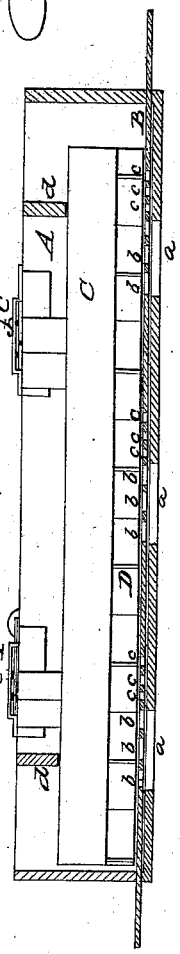
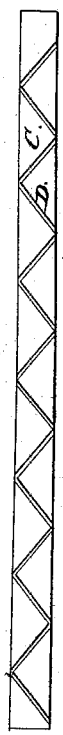
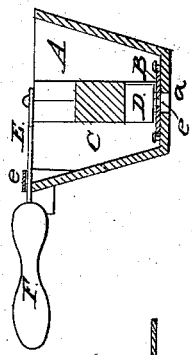

UNITED STATES PATENT OFFICE.

LEWIS MOORE, OF YPSILANTI, MICHIGAN.

IMPROVEMENT IN SEEDING-MACHINES.

Specification forming part of Letters Patent No. 21,354, dated August 31, 1858.

*To all whom it may concern:*

Be it known that I, LEWIS MOORE, of Ypsilanti, in the county of Washtenaw and State of Michigan, have invented a new and Improved Seed-Drill for Planting Flax, Grass, and other Seeds; and I do hereby declare that the following is a full, clear, and exact description of the same, reference being had to the annexed drawings, making a part of this specification, in which—

Figure 1 is a plan or top view of my improvement. Fig. 2 is a longitudinal vertical section of the same. Fig. 3 is an inverted plan of the reciprocating zigzag plate. Fig. 4 is a transverse vertical section of my improvement. Fig. 5 is a detached view of a portion of the perforated slide.

Similar letters of reference indicate corresponding parts in the several figures.

The nature of my invention consists in the combination of the thin zigzag strip projecting from the bottom of a reciprocating bar with an adjustable gage-plate which has different-sized seed-cells and a hopper having oblong slots or discharge-passages in its bottom. By using the zigzag plate a very thorough and perfect agitation and sweeping of the seed into the cells of the gage-plate is accomplished, and the cost of the machine is lessened, as the zigzag plate can be produced by the stamping process, and may be formed of light, cheap metal, as its form gives it great strength when it is attached to the reciprocating bar; and by having the gage-plate furnished with a series of holes and arranged over oblong discharge-passages different kinds of grain can be planted and more or less sown to the acre.

A represents the hopper, which is of the usual form, or such as is used in many seed-drills. The bottom of the hopper has oblong slots $a$ cut through it at suitable distances apart. Three slots are shown in Fig. 2, but more may be used, if necessary.

On the bottom of the hopper A there is placed a plate, B, the ends of which pass through the sides or end pieces of the hopper. This plate is perforated with holes $b\ c$. (See Fig. 5.) These holes vary in size, so as to accommodate different-sized seeds, and the holes of the proper size are brought under the slots $a$ in the bottom of the hopper by moving the plate B, which is allowed to slide longitudinally on the bottom of the hopper.

Within the hopper A, and near each end, there is placed a transverse partition, $d$, having recesses cut through them, in which recesses a bar, C, is fitted and works, the recesses serving as guides for the bar.

To the under surface of the bar C there is attached a zigzag plate or strip, D, the form of which is plainly shown in Fig. 3. The lower edge of this plate D rests upon the plate B, as shown in Fig. 2.

To the upper surface of the bar C there is attached the inner end of a lever, E, having its fulcrum at $e$.

The outer end of the lever D is provided with a handle, F.

There is also another lever, G, attached to the upper surface of the bar C, the lever G having its fulcrum at $f$.

The hopper A is supplied or filled with the seed to be sown, and the plate B is adjusted or moved so as to bring the proper sized holes over the slots $a$.

The hopper A may be attached to a frame, and the reciprocating bar C operated by gearing suspended from the shoulders of the operator, so as to be directly in front of him, and as the operator walks along the lever E is moved or vibrated by grasping the handle F of the lever. The bar C consequently will have a reciprocating motion given it, and the zigzag plate D will draw or force the seed over the holes in the plate B, through which holes the seed falls upon the ground.

It will be seen that by having different-sized holes in the plate B different-sized seeds may be sown. The reciprocating bar and plate C D insure the equal or regular distribution of the seed.

The implement is extremely simple, economical to manufacture, and not liable to get out of repair.

What I claim as my invention, and desire to secure by Letters Patent, is—

The combination of the zigzag strip D, projecting from the bottom of a reciprocating bar, C, with an adjustable gage-plate, B, which has different-sized seed-cells $b\ c$, and with a hopper, A, having oblong slots or discharge-passages $a$ in its bottom, substantially as and for the purposes set forth.

LEWIS MOORE.

Witnesses:
SHERMAN ENOS,
ELIAS M. SKINNER.